United States Patent [19]

Takimoto et al.

[11] Patent Number: 4,894,078
[45] Date of Patent: Jan. 16, 1990

[54] METHOD AND APPARATUS FOR PRODUCING OPTICAL FIBER

[75] Inventors: Hiroaki Takimoto; Katsuji Sakamoto, both of Yokohama, Japan

[73] Assignee: Sumitomo Electric Industries, Ltd., Osaka, Japan

[21] Appl. No.: 252,107

[22] Filed: Oct. 3, 1988

[30] Foreign Application Priority Data

Oct. 14, 1987 [JP] Japan ................... 62-257234

[51] Int. Cl.$^4$ ............................................. C03C 25/02
[52] U.S. Cl. ............................................. 65/3.4; 65/12; 65/13
[58] Field of Search .................... 65/3.41, 3.4, 3.43, 65/3.44, 12, 13

[56] References Cited

U.S. PATENT DOCUMENTS 3,912,478 10/1975 Presby ........................................ 65/2
4,028,081 6/1977 Marcatili .................................... 65/2
4,664,689 5/1987 Davis ........................................ 65/12

FOREIGN PATENT DOCUMENTS 0079186 5/1983 European Pat. Off. .
0235746 9/1987 European Pat. Off. .

Primary Examiner—Arthur Kellogg
Attorney, Agent, or Firm—Cushman, Darby & Cushman

[57] ABSTRACT

In a method for producing an optical fiber having a resin coating, an optical fiber which is drawn from a preform for an optical fiber heated and melt by a heating source can be effectively cooled before it is coated with a resin by cooling the drawn fiber by cooling gas in such a manner that, in a first plane which is perpendicular to an axis of the drawn fiber or a first conical surface which has a cone point on the axis of the drawn fiber, the cooling gas is blown against the fiber from one direction on said first plane or said first cone surface, and in a second plane which is perpendicular to the axis of the drawn fiber and apart from said first plane or a second conical surface which has a cone point on the axis of the drawn fiber and is apart from said first conical surface, the cooling gas is blown against the fiber from other direction on said second plane or said second conical surface so that a sum of components of all vectors of the cooling gas in x and y dimensions in the three-dimensional space with a z dimension in the drawn fiber direction is substantially zero (0) where a length and a direction of the vector are represented by a flow rate and a direction of the cooling gas, respectively.

4 Claims, 4 Drawing Sheets

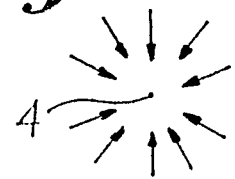 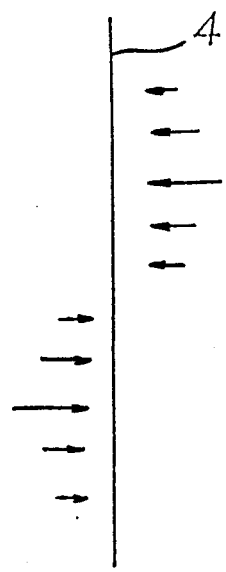
Fig.3a. Fig.3b.
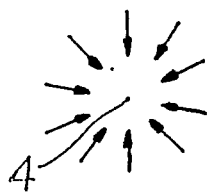 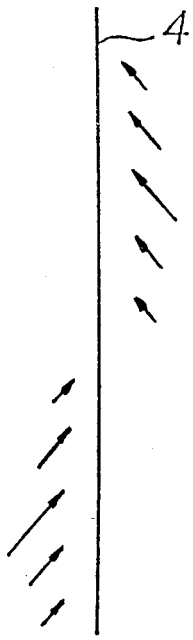
Fig.4a. Fig.4b.

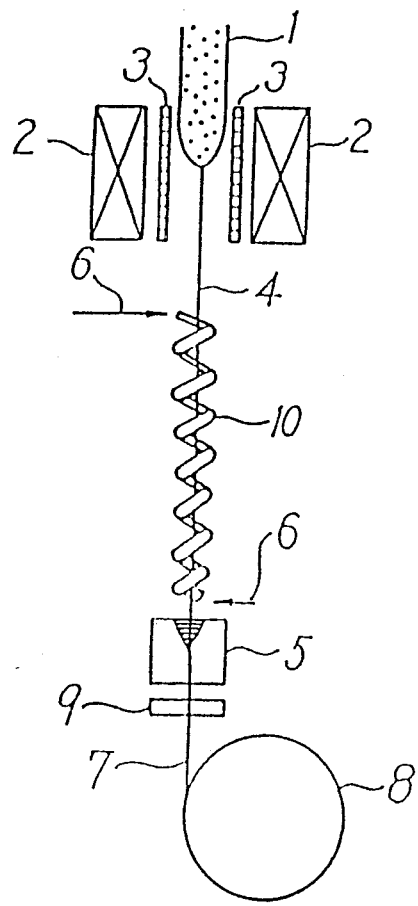
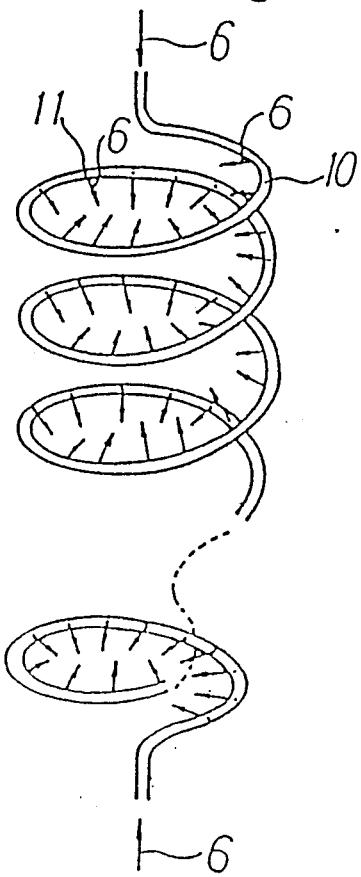
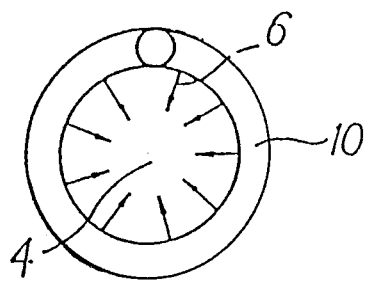

METHOD AND APPARATUS FOR PRODUCING OPTICAL FIBER

BACKGROUND OF THE INVENTION

1. Field of the Invention

The present invention relates to a method and an apparatus for producing an optical fiber. More particularly, the present invention relates to improvement of a method and an apparatus for producing an optical fiber which comprises heating and melting a glass preform for an optical fiber (hereinafter referred to as "preform"), drawing the melted preform from its one end at a constant tension to form a fiber and coating a peripheral surface of the drawn fiber with a resin to finish an optical fiber.

2. Description of the Related Art

Usually, an optical fiber is produced as follows:

As shown in FIG. 1, a preform 1 produced in a separated step is inserted in a muffle tube 3 of a heating furnace 2 and the melted glass is drawn from its lower end at a constant tension. A drawn fiber 4 is cooled by spontaneous heat radiation during drawing and then passed through a coating die 5 containing a liquid resin to coat the resin around a peripheral surface of the drawn fiber 4. Thereafter, the resin is hardened in a furnace 9 and a finished optical fiber 7 is wound by a drum 8.

The reasons why the peripheral surface of the drawn fiber 4 is coated with the resin during the production of the optical fiber 7 are as follows:

Since the drawn fiber 4 is a very thin and fragile glass fiber and has a diameter of 100 to 150 $\mu$m, it is so weak as to be broken under a tensile load of about 100 g.

Since the drawn fiber is made of glass, different from metals, it tends to suffer from brittle facture and a minute flaw made on the fiber surface easily grows and finally breaks the optical fiber.

Therefore, the surface of the drawn fiber is coated with the resin to increase tensile strength and flexural strength.

To increase productivity of the optical fiber, a drawing rate of the fiber should be increased. When the peripheral surface of the drawn fiber is coated with a synthetic resin such as an ultraviolet curable resin, since the drawn fiber is drawn from the melt preform, sometimes it is not sufficiently cooled although it is cooled by radiation during drawing. If the insufficiently cooled drawn fiber is passed through the coating die 5, a coated layer of the resin is thermally affected by the drawn fiber and a viscosity of the resin around the drawn fiber is decreased too much so that a thickness of the coated layer is not uniform.

To overcome such drawbacks, conventionally, a gas is blown against the drawn fiber just after it is drawn from the melt preform (cf. Japanese Patent Publication No. 39496/1979). This method is shown in FIG. 2, in which the reference 6 represents a cooling gas, and the same references represent the same parts as in FIG. 1.

As the drawing rate is increased to improve the productivity, an amount of heat to be deprived from the drawn fiber should be increased. When the cooling gas is blown in a direction parallel to the fiber as in the method shown in FIG. 2, a gas near the fiber is hardly exchanged and the heat is transferred from the gas near the fiber to the gas in an outside layer by heat conduction. Therefore, the cooling efficiency in this method is not satisfactory. To increase the heat conduction, helium or hydrogen can be used. However the former is expensive and the latter is dangerous due to explosion.

SUMMARY OF THE INVENTION

One object of the present invention is to improve a cooling manner of the drawn fiber which is drawn from the melt preform so as to increase the cooling efficiency of the drawn fiber.

Another object of the present invention is to provide a method for producing an optical fiber in which the drawn fiber is efficiently cooled and coated with a resin coating having improved quality and stability.

Further object of the present invention is to provide an apparatus for carrying out the method of the present invention for producing the optical fiber.

According to the first aspect of the present invention, there is provided a method for producing an optical fiber comprising steps of:

drawing a fiber from a preform for an optical fiber which is heated and melted by a heating source at a constant tension, cooling the drawn fiber by cooling gas in such a manner that, in a first plane which is perpendicular to an axis of the drawn fiber or a first conical surface which has a cone point on the axis of the drawn fiber, the cooling gas is blown against the fiber from one direction on said first plane or said first cone surface, and in a second plane which is perpendicular to the axis of the drawn fiber and apart from said first plane or a second conical surface which has a cone point on the axis of the drawn fiber and is apart from said first conical surface, the cooling gas is blown against the fiber from other direction on said second plane or said second conical surface so that a sum of components of all vectors of the cooling gas in x and y dimensions in the three-dimensional space with a z dimension in the drawn fiber direction is substantially zero (0) where a length and a direction of the vector are represented by a flow rate and a direction of the cooling gas, respectively, and then coating the cooled fiber with a resin melt to obtain a finished optical fiber.

According to the second aspect of the present invention, there is provided an apparatus for producing an optical fiber comprising means for drawing a fiber from a preform for an optical fiber which is heated and melt by a heating source at a constant tension, a pipe for cooling the drawn fiber which has blowout holes arranged in such a layout that, in a first plane which is perpendicular to an axis of the drawn fiber or a first conical surface which has a cone point on the axis of the drawn fiber, the cooling gas is blown against the fiber from one blowout hole, and in a second plane which is perpendicular to the axis of the drawn fiber and apart from said first plane or a second conical surface which has a cone point on the axis of the drawn fiber and is apart from said first conical surface, the cooling gas is blown against the fiber from other blown hole so that a sum of components of all vectors of the cooling gas in x and y dimensions in the three-dimensional space with a z dimension in the drawn fiber direction is substantially zero (0) where a length and a direction of the vector are represented by a flow rate and a direction of the cooling gas, respectively, and which is provided around the drawn fiber, means for coating the cooled fiber with a resin melt to obtain a finished optical fiber.

BRIEF DESCRIPTION OF THE DRAWINGS

FIGS. 3A and 3B are a conceptual plan view and a conceptual vertical cross sectional view, respectively where a cooling gas is blown in directions perpendicular to a drawn fiber according to the present invention, FIGS. 4A and 4B are a conceptual plan view and a conceptual vertical cross sectional view, respectively where a cooling gas is blown in directions on conical surfaces which have their cone point on the axis of the drawn fiber according to the present invention, FIG. 5 schematically shows one embodiment of the method and apparatus for producing an optical fiber according to the present invention, FIGS. 6 and 7 are a perspective view and a horizontal cross sectional view of a spiral pipe for blowing a cooling gas against the drawn fiber, respectively.

DETAILED DESCRIPTION OF THE INVENTION

When the cooling gas is blown against the drawn fiber from a side direction, namely from a direction which is not parallel to the axis of the drawn fiber (i.e. a drawing direction) to increase the amount of heat to be deprived from the drawn fiber, it is expected that the cooling efficiency by the gas is maximized by maintaining a temperature of the cooling gas near the drawn fiber as low as possible. If the cooling gas is blown from only one direction or if an amount of the cooling gas blown from one direction is larger than that from other directions, by a force generated by the cooling gas in said one direction and accumulated in a longitudinal direction, the drawn fiber is deflected in said one direction so that from the neck down is adversely affected According to the present invention, since the cooling gas is blown from the blowout holes so that the sum of components of the vectors of the cooling gas in a plane perpendicular to the drawn fiber (when the length and the direction of the vector are represented by the flow rate and the direction of the cooling gas, respectively) is made substantially zero, the drawn fiber is not deflected during the cooling step from a line along which the drawn fiber can pass if no cooling gas is blown against the fiber.

The present invention will be illustrated by making reference to the accompanying drawings.

FIGS. 3A and 3B are a conceptual plan view and a conceptual vertical cross sectional view, respectively where a cooling gas is blown in directions perpendicular to a drawn fiber according to the present invention, and FIGS. 4A and 4B are a conceptual plan view and a conceptual vertical cross sectional view, respectively where a cooling gas is blown in directions on conical surfaces which have their cone point on the axis of the drawn fiber according to the present invention.

In either case of FIGS. 3A and 3B and FIGS. 4A and 4B, each arrow represents a direction in which the cooling gas is blown, and in the plane view, the cooling gas is blown in the direction perpendicular to the drawn fiber. In addition, as seen from the vertical cross sectional views of FIGS. 3B and 4B, each arrow is directed to a different point on the drawn fiber.

Needless to say, the processes of FIGS. 3A and 3B and of FIGS. 4A and 4B can be employed simultaneously.

Figure 1:
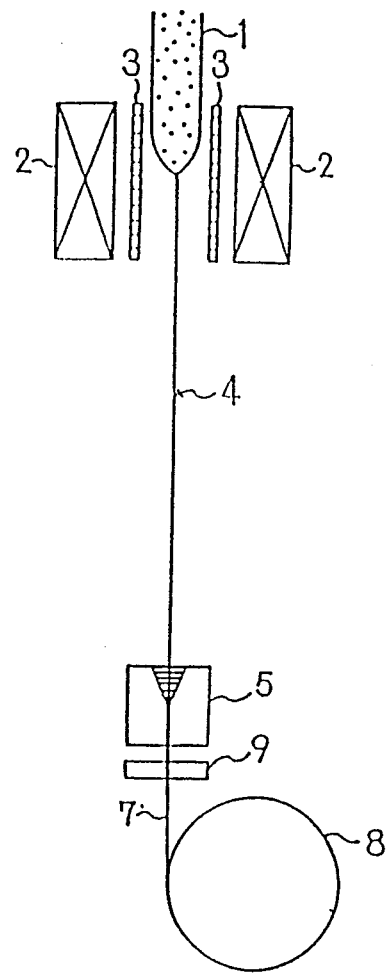
FIG. 1 schematically shows a conventional method for producing an optical fiber, FIG. 2 schematically shows a method for producing an optical fiber disclosed in Japanese Patent Publication No. 39496/1979.
Figure 2:
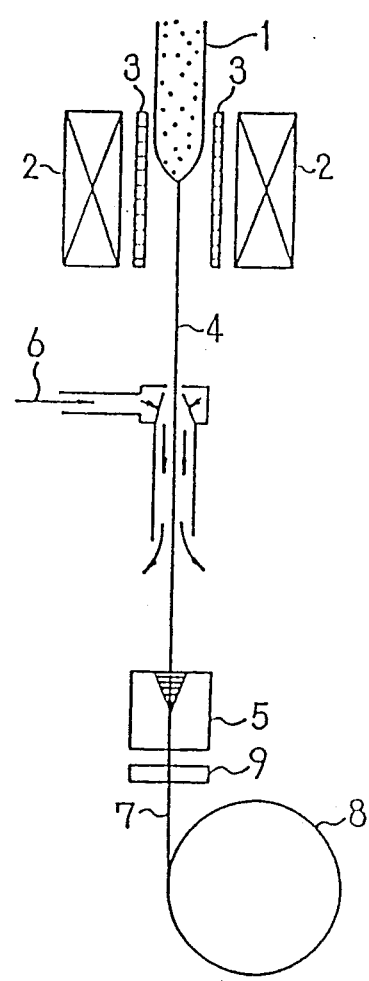

FIG. 5 schematically shows one embodiment of the method and apparatus for producing the optical fiber according to the present invention. The references 1 through 9 have the same meanings as in FIGS. 1 and 2. In FIG. 5, a cooling gas 6 flows in a spiral pipe 10 from its lower end to its upper end. The spiral pipe 10 has plural small blowout holes 11 on its inner side as shown in FIG. 6 and is provided between the heating furnace 2 and the coating die 5 with aligning a spiral axis on the drawn fiber as shown in FIGS. 5 and 7. The cooling gas 6 is blown against the drawn fiber as shown in FIGS. 6 and 7. The holes 11 are so arranged that, on a plane perpendicular to the drawn fiber, the gas is blown from one hole on said plane but no pair of the holes are present at the same height on a vertical plane including the fiber axis. Thereby, the sum of the components of the cooling gas vectors in x and y dimensions in a three-dimensional space with a z dimension in the drawn fiber direction can be made substantially zero.

Figure 8:
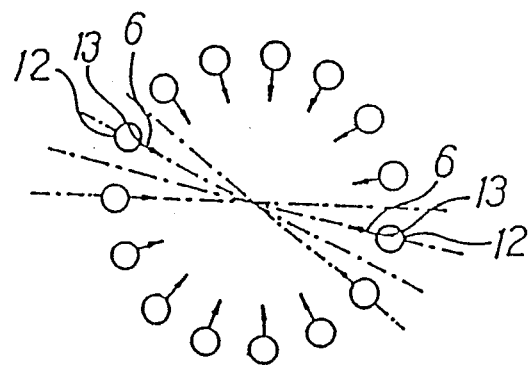
FIGS. 8 and 9 are a horizontal cross sectional view and a vertical cross sectional view of another embodiment of pipes for supplying a cooling gas.
Figure 9:
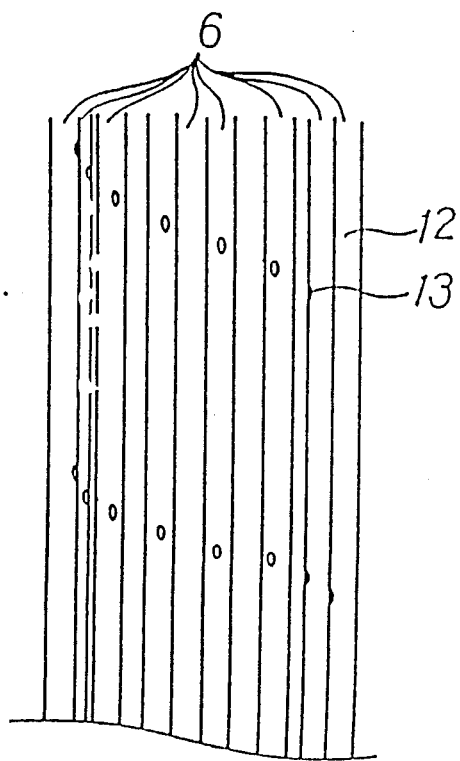

Alternatively, as shown in a horizontal cross section of FIG. 8 and a vertical cross section of FIG. 9, plural pipes 12 are vertically arranged surrounding and in parallel with the drawn fiber, and blowout holes 13 are provided on the inside walls of the pipes in such manner that no pair of the blowout holes are arranged at point-symmetric positions around the drawn fiber and all the holes are positioned at different heights.

In the present invention, as the cooling gas, air, oxygen, nitrogen, helium, argon and mixtures thereof may be used. A temperature of the cooling gas may be any temperature lower than the temperature of the drawn fiber and preferably room temperature or lower. The lower the temperature, the better.

According to the present invention, as shown in FIGS. 7 and 8, the cooling gas 6 kept at a temperature lower than the temperature of the drawn fiber is blown against the drawn fiber 4 in a direction which is not parallel to the drawn fiber. Therefore, the atmosphere near the drawn fiber is always kept at the temperature of the cooling gas 6 so that heat is effectively exchanged between the drawn fiber 4 and the cooling gas 6 near the fiber and the drawn fiber 4 is rapidly cooled.

EXAMPLE

By using the apparatus of FIG. 5, a quartz glass fiber having a diameter of 125 μm was drawn. The apparatus had a spiral pipe which was provided from 1 meter to 3.5 meters below the heating furnace 2. From the pipe, air kept at about 20° C. was blown at a flow rate of 180 l/min, and the drawn fiber was passed through the spiral pipe at a rate of 500 m/min. At the lower end of the pipe, the drawn fiber was cooled to 140° C. During cooling, no deflection of the fiber was observed. On the contrary, without the blow of the air, the temperature of the drawn fiber was 330° C. at the lower end of the pipe.

In the same manner as above but blowing the cooling gas in a direction upward by 45° from the horizontal plane, the drawn fiber was cooled to 100° C.

As understood from the above description, by the method and apparatus according to the present invention, the cooling efficiency of the drawn fiber is greatly improved in comparison with the conventional method and the vibration of the drawn fiber during cooling is prevented. In addition, when the cooling gas is kept clean, the atmosphere near the drawn fiber which is being cooled can be kept clean, for example, in Class 10 in case where the apparatus of FIG. 5 is used.

What is claimed is:

1. A method for producing an optical fiber comprising the steps of:

drawing a fiber from a preform for an optical fiber which is heated and melted by a heating source at a constant tension, cooling the drawn fiber by use of a cooling gas blown from a non-symmetrical blowout hole layout in such a manner that, in one of a first plane which is perpendicular to an axis of the drawn fiber and a first conical surface which has a cone point on the axis of the drawn fiber, the cooling gas is blown against the fiber from one direction on one of said first plane and said first cone surface, and in one of a second plane which is perpendicular to the axis of the drawn fiber and apart from said first plane and a second conical surface which has a cone point on the axis of the drawn fiber and is apart from said first conical surface, the cooling gas is blown against the fiber from another direction on one of said second plane and said second conical surface so that a sum of components of all vectors of the cooling gas in x and y dimensions in a three-dimensional space having a z dimension in the drawn fiber direction is substantially zero where a length and a direction of the vector are represented by a flow rate and a direction of the cooling gas, respectively, and then coating the cooled fiber with a resin melt to obtain a finished optical fiber.

2. An apparatus for producing an optical fiber comprising:

means for drawing a fiber from a preform for an optical fiber which is heated and melted by a heating source and drawn at a constant tension, a pipe means for cooling the drawn fiber which has blowout holes arranged in a non-symmetrical layout such that, in one of a first plane which is perpendicular to an axis of the drawn fiber and a first conical surface which has a cone point on the axis of the drawn fiber, the cooling gas is blown against the fiber from one blowout hole, and in one of a second plane which is perpendicular to the axis of the drawn fiber and apart from said first plane and a second conical surface which has a cone point on the axis of the drawn fiber and is apart from said first conical surface, the cooling gas is blown against the fiber from a second blowout fiber hole such that a sum of components of all vectors of the cooling gas in x and y dimensions in a three-dimensional space, within said pipe means, with a z dimension in the drawn fiber direction is substantially zero where a length and a direction of the vector are represented by a flow rate and a direction of the cooling gas, respectively, and which is provided around the drawn fiber, means for coating the cooled fiber with a resin melt to obtain a finished optical fiber.

3. The apparatus according to claim 2, wherein the pipe means for cooling the drawn fiber consists of a spiral pipe its spiral axis is aligned on the drawn fiber.

4. The apparatus according to claim 2, wherein the pipe means for cooling the drawn fiber consists of plural pipes which are vertically arranged surrounding and in parallel with the drawn fiber, and the blowout holes are provided on inside walls of the pipes in such manner that no pair of the blowout holes are arranged at point-symmetric positions around the drawn fiber and all the holes are positioned at different height.

* * * * *